United States Patent
Khan et al.

(10) Patent No.: US 7,969,859 B2
(45) Date of Patent: Jun. 28, 2011

(54) METHOD AND SYSTEM FOR DYNAMICALLY ALLOCATING SUB-CARRIERS IN AN ORTHOGONAL FREQUENCY DIVISION MULTIPLEXING NETWORK

(75) Inventors: Farooq Khan, Allen, TX (US); Joseph R. Cleveland, Murphy, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 1226 days.

(21) Appl. No.: 11/314,454

(22) Filed: Dec. 21, 2005

(65) Prior Publication Data

US 2006/0209755 A1   Sep. 21, 2006

Related U.S. Application Data

(60) Provisional application No. 60/663,076, filed on Mar. 18, 2005.

(51) Int. Cl.
*H04J 11/00* (2006.01)
(52) U.S. Cl. .................. 370/208; 370/338; 370/465
(58) Field of Classification Search ................. None
See application file for complete search history.

(56) References Cited

U.S. PATENT DOCUMENTS

| | | | |
|---|---|---|---|
| 7,133,646 B1 * | 11/2006 | Miao ................. | 455/73 |
| 2003/0103445 A1 * | 6/2003 | Steer et al. ........ | 370/208 |
| 2006/0034165 A1 * | 2/2006 | Levy ................. | 370/208 |
| 2006/0109923 A1 * | 5/2006 | Cai et al. .......... | 375/260 |
| 2006/0135075 A1 * | 6/2006 | Tee et al. .......... | 455/67.13 |

* cited by examiner

*Primary Examiner* — Phuoc Doan
*Assistant Examiner* — Lester Kincaid

(57) ABSTRACT

A method of dynamically allocating sub-carriers for communication in an Orthogonal Frequency Division Multiplex network is provided. The method includes monitoring network conditions and allocating sub-carriers for the base station to a set of downlink sub-carriers or to a set of uplink sub-carriers based on the network conditions.

16 Claims, 4 Drawing Sheets

METHOD AND SYSTEM FOR DYNAMICALLY ALLOCATING SUB-CARRIERS IN AN ORTHOGONAL FREQUENCY DIVISION MULTIPLEXING NETWORK

CROSS-REFERENCE TO RELATED APPLICATION AND CLAIM OF PRIORITY

The present invention is related to the invention disclosed in U.S. Patent Application Ser. No. 60/663,076, entitled "Flexible duplexing scheme for wireless communications," filed on Mar. 18, 2005. Patent Application Ser. No. 60/663,076 is assigned to the assignee of the present application. The subject matter disclosed in Patent Application Ser. No. 60/663,076 is hereby incorporated by reference into the present disclosure as if fully set forth herein.

TECHNICAL FIELD OF THE INVENTION

The present disclosure relates generally to wireless communications and, more specifically, to a method and system for dynamically allocating sub-carriers for communication in an orthogonal frequency division multiplexing (OFDM) network.

BACKGROUND OF THE INVENTION

Currently-implemented OFDM networks use either a frequency division duplexing (FDD) or a time division duplexing (TDD) scheme. In FDD-based communication systems, the uplink uses a different frequency band from the downlink. Typically, these systems make use of symmetric spectrum allocation, i.e., the bandwidth allocated to the downlink is the same as in the uplink. Disadvantages of this approach include the use of a fixed spectrum band that is inflexible to reconfiguration of the uplink and downlink bandwidth to support different data rate and capacity requirements for different classes of service. In TDD-based communication systems, the uplink and the downlink share the same frequency band, but the uplink and downlink transmissions occur at different times. Thus, these systems provide flexible use of the spectrum between uplink and downlink. However, disadvantages with this approach include delays in transmissions due to having to wait for the allotted transmission time and lower link budgets due to mobile stations not being able to transmit continuously.

Therefore, there is a need in the art for an improved method for allocating sub-carriers for communication in an OFDM network. In particular, there is a need for a system that provides spectrum flexibility to accommodate downlink and uplink traffic asymmetry and that does not suffer from delays and a lower link budget.

SUMMARY OF THE INVENTION

A method for dynamically allocating sub-carriers for communication in an orthogonal frequency division multiplexing (OFDM) network is provided. According to an advantageous embodiment of the present disclosure, the method includes monitoring network conditions and allocating sub-carriers for the base station to a set of downlink sub-carriers or to a set of uplink sub-carriers based on the network conditions.

According to another embodiment of the present disclosure, the method includes assigning sub-carriers for the base station to a set of guard sub-carriers or to a set of communication sub-carriers and monitoring network conditions. The communication sub-carriers are allocated to a set of downlink sub-carriers or to a set of uplink sub-carriers based on the network conditions. The downlink sub-carriers are allocated to a plurality of subscriber stations, and the uplink sub-carriers are also allocated to the subscriber stations.

According to yet another embodiment of the present disclosure, a base station is provided that includes a network monitor and a sub-carrier allocator that is coupled to the network monitor. The network monitor is operable to monitor network conditions and to provide the network conditions to the sub-carrier allocator. The sub-carrier allocator is operable to allocate sub-carriers for the base station to a set of downlink sub-carriers or to a set of uplink sub-carriers based on the network conditions.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Figure 1:
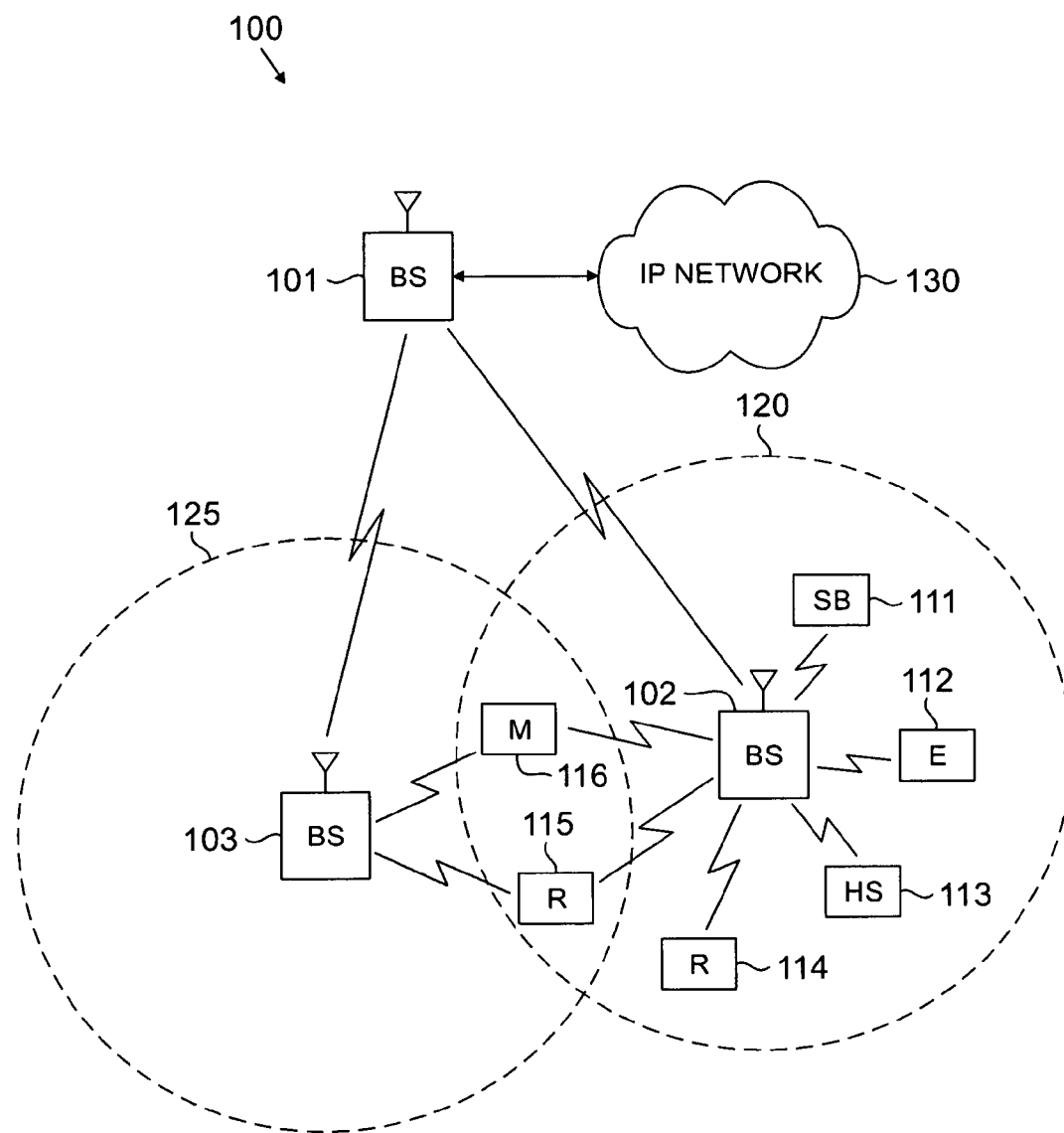
FIG. 1 illustrates an exemplary Orthogonal frequency division multiplexing wireless network that is capable of dynamically allocating sub-carriers for communication according to an embodiment of the present disclosure.

FIG. 1 illustrates an exemplary orthogonal frequency division multiplexing wireless network 100 that is suitable for dynamically allocating sub-carriers for communication according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. In an exemplary embodiment, SS 111 may be located in a small business (SB), SS 112 may be located in an enterprise (E), SS 113 may be located in a WiFi hotspot (HS), SS 114 may be located in a first residence, SS 115 may be located in a second residence, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be operating in soft handoff, as known to those of skill in the art.

In an exemplary embodiment, base stations 101-103 may communicate with each other and with subscriber stations 111-116 using an IEEE-802.16, 802.20, or 802.11 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight with base station 102 and base station 103. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

In accordance with an embodiment of the present disclosure, each base station 102-103 is operable to use sub-carrier division duplexing (SDD) to divide the available bandwidth for that base station 102-103 between the downlink and the uplink. In implementing SDD, it will understood that base station 102 and/or 103 may communicate directly with IP network 130, instead of indirectly through base station 101, without departing from the scope of the present disclosure. For OFDM network 100, the total available frequency band is divided into N sub-carriers, where N corresponds to the size of the FFT/IFFT being used. Each of the N sub-carriers may be allocated to either downlink or uplink, and this allocation may be changed dynamically based on the network conditions, such as downlink and uplink traffic conditions, in order to make efficient use of the radio spectrum.

This SDD technique allows each base station 102-103 to receive independent transmissions from one or more subscriber stations 111-116 on the uplink and to transmit to one or more subscriber stations 111-116 on the downlink simultaneously using the same carrier bandwidth. Thus, latency is reduced and link budget is increased, while asymmetric bandwidth allocation is permitted between the downlink and the uplink. In networks that use TCP/IP, the maximum throughput is inversely proportional to the one-way latency. Also, for VoIP services, user perception of voice quality decreases as latency increases. Therefore, reducing latency allows increased throughput in TCP/IP networks and increased voice quality for VoIP services.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from about 100 meters to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. The servers, Internet gateway, and public switched telephone network gateway are not shown in FIG. 1. In another embodiment, the connection to network 130 may be provided by different network nodes and equipment.

Figure 2:
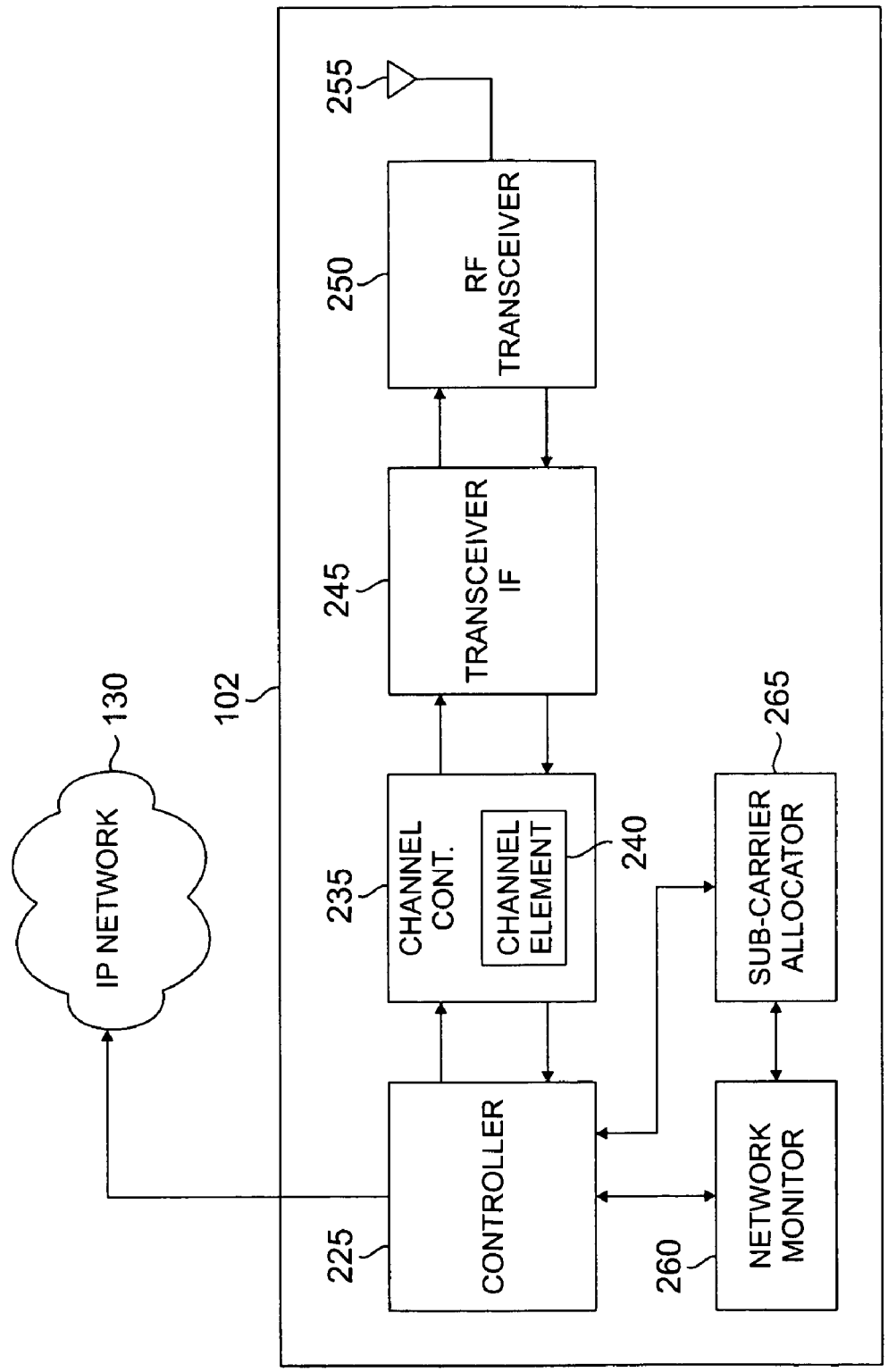
FIG. 2 illustrates an exemplary base station that is capable of dynamically allocating sub-carriers for communication according to an embodiment of the present disclosure.

FIG. 2 illustrates exemplary base station 102 in greater detail according to one embodiment of the present disclosure. Base station 102 is illustrated by way of example only. However, it will be understood that the components illustrated and described with respect to base station 102 are also part of base stations 101 and 103. In one embodiment, base station 102 comprises controller 225, channel controller 235, transceiver interface (IF) 245, radio frequency (RF) transceiver unit 250, antenna array 255, network monitor 260 and sub-carrier allocator 265.

Controller 225 comprises processing circuitry and memory capable of executing an operating program that controls the overall operation of base station 102. In an embodiment, controller 225 may be operable to communicate with network 130. Under normal conditions, controller 225 directs the operation of channel controller 235, which comprises a number of channel elements, such as exemplary channel element 240, each of which performs bidirectional communication in the forward channel and the reverse channel. A forward channel (or downlink) refers to outbound signals from base station 102 to subscriber stations 111-116. A reverse channel (or uplink) refers to inbound signals from subscriber stations 111-116 to base station 102. Channel element 240 also preferably performs all baseband processing, including processing any digitized received signal to extract the information or data bits conveyed in the received signal, typically including demodulation, decoding, and error correction operations, as known to those of skill in the art. Transceiver IF 245 transfers bidirectional channel signals between channel controller 235 and RF transceiver unit 250.

Antenna array 255 transmits forward channel signals received from a power amplifier (not shown) in RF transceiver unit 250 to subscriber stations 111-116 in the coverage area of base station 102. Antenna array 255 is also operable to send to a low-noise amplifier (not shown) in RF transceiver unit 250 reverse channel signals received from subscriber stations 111-116 in the coverage area of the base station 102. Those skilled in the art will recognize that RF transceiver unit 250 may include a duplexer for isolating transmitted and received signals at the interface to antenna array 255. According to one embodiment of the present disclosure, antenna array 255 comprises a multi-sector antenna, such as a three-sector antenna in which each antenna sector is responsible for transmitting and receiving in a coverage area corresponding to an arc of approximately 120 degrees. Additionally, RF transceiver unit 250 may comprise an antenna selection unit to select among different antennas in antenna array 255 during both transmit and receive operations.

Although illustrated and described as two separate components, it will be understood that network monitor 260 and sub-carrier allocator 265 may be implemented together in a single component without departing from the scope of the present disclosure. Network monitor 260 is operable to monitor network conditions, such as traffic conditions, for network 100 and to provide the network conditions to sub-carrier allocator 265. Sub-carrier allocator 265 may be coupled to network monitor 260 and is operable to dynamically allocate sub-carriers for communication between base station 102 and subscriber stations 111-116 based on the network conditions as monitored by network monitor 260, as described in more detail below in connection with FIGS. 3 and 4.

Figure 3:
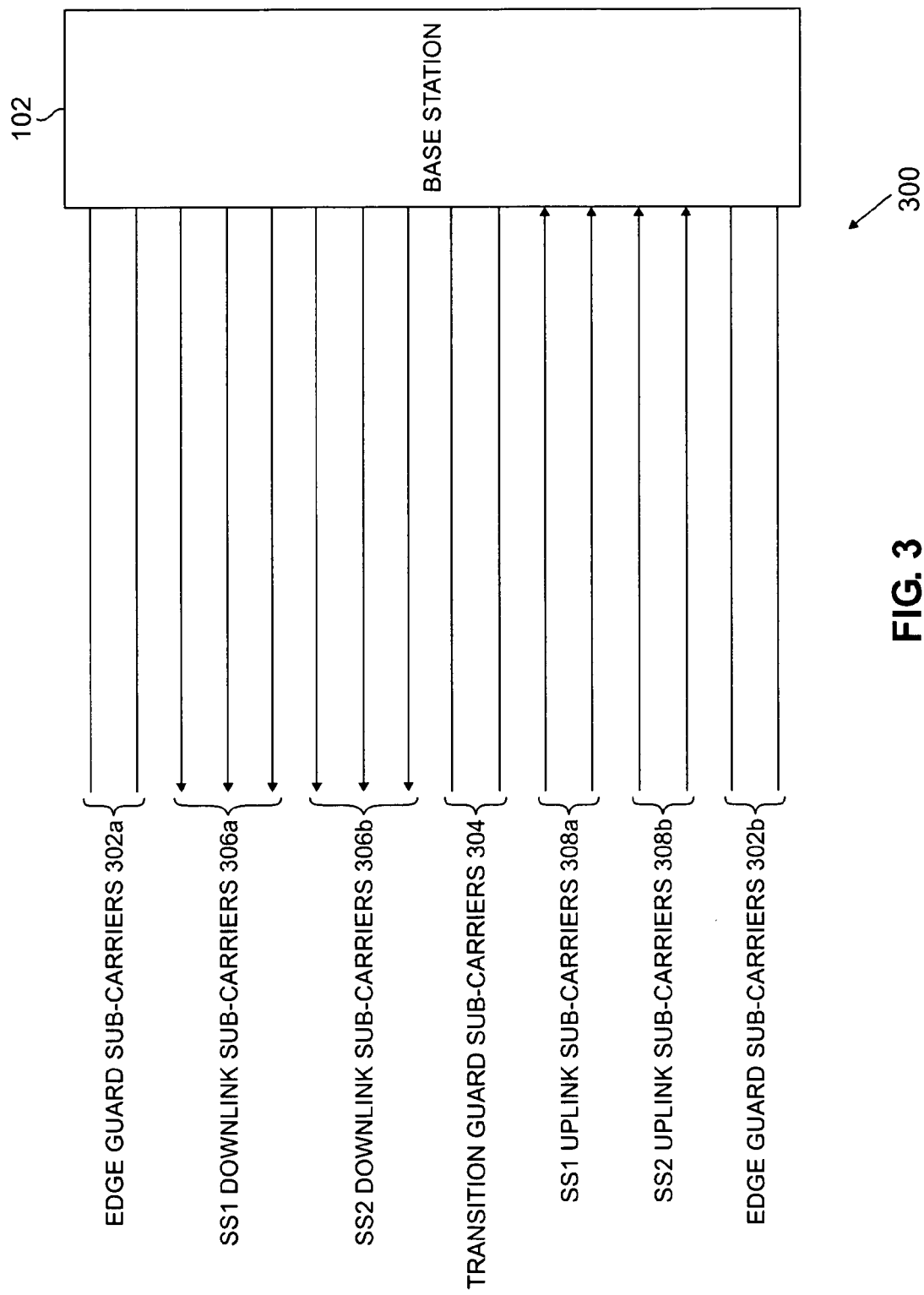
FIG. 3 illustrates a sub-carrier division duplexing scheme for allocating sub-carriers for communication according to an embodiment of the present disclosure.

FIG. 3 illustrates a sub-carrier division duplexing (SDD) scheme 300 for allocating sub-carriers for communication according to an embodiment of the present disclosure. Base station 102 is illustrated by way of example only. However, it will be understood that SDD scheme 300 may be implemented using any suitable base station in network 100, such as base station 103.

For simplicity, 16 sub-carriers are shown for communication with two subscriber stations 111-116 (SS1 and SS2) in the illustrated embodiment. However, it will be understood that SDD scheme 300 may be implemented using any suitable number of sub-carriers and any suitable number of subscriber stations 111-116.

SDD scheme 300 comprises two types of sub-carriers: guard sub-carriers 302 and 304 and communication sub-carriers 306 and 308. Each of the two types of sub-carriers also comprises two sub-types of sub-carriers. Guard sub-carriers comprise edge guard sub-carriers 302a-b and transition guard sub-carriers 304, and communication sub-carriers comprise downlink sub-carriers 306a-b and uplink sub-carriers 308a-b. Either or both types of guard sub-carriers 302 and 304 may be optional in some embodiments of SDD scheme 300.

For the illustrated embodiment, each set of guard sub-carriers 302a, 302b and 304 comprises two sub-carriers, and communication sub-carriers are divided into six downlink sub-carriers 306 and four uplink sub-carriers 308. It will be understood that this allocation of sub-carriers may be changed dynamically at any time based on network conditions. Thus, for example, if additional sub-carriers are needed for the downlink while the uplink is not being fully used, base station 102 may allocate eight sub-carriers as downlink sub-carriers 306 and two sub-carriers as uplink sub-carriers 308.

Edge guard sub-carriers 302a and 302b are operable to provide a guard to protect against interference between communication using the sub-carriers assigned to base station 102 and frequency bands that may be assigned to other systems. Similarly, transition guard sub-carriers 304 are operable to provide a guard to protect against interference between communication on the downlink sub-carriers 306 and communication on the uplink sub-carriers 308.

Downlink sub-carriers 306 are allocated to a first subscriber station (SS1) and to a second subscriber station (SS2), with three of the six downlink sub-carriers 306 allocated to each. Similarly, uplink sub-carriers 308 are allocated to the first subscriber station (SS1) and to the second subscriber station (SS2), with two of the four uplink sub-carriers 308 allocated to each. However, it will be understood that both the downlink sub-carriers 306 and the uplink sub-carriers 308 may be allocated to the subscriber stations (SS1 and SS2) in any suitable manner as opposed to being equally divided.

For one embodiment, sub-carrier allocator 265 may be operable to assign the available sub-carriers to the set of guard sub-carriers 302 and 304 or to the set of communication sub-carriers 306 and 308. For another embodiment, an operator of base station 102 may assign the available sub-carriers to the set of guard sub-carriers 302 and 304 or to the set of communication sub-carriers 306 and 308. Sub-carrier allocator 265 is operable to allocate the communication sub-carriers to downlink sub-carriers 306 or uplink sub-carriers 308 and is operable to allocate both types of communication sub-carriers 306 and 308 to the first and second subscriber stations 111-116 (SS1 and SS2).

Figure 4:
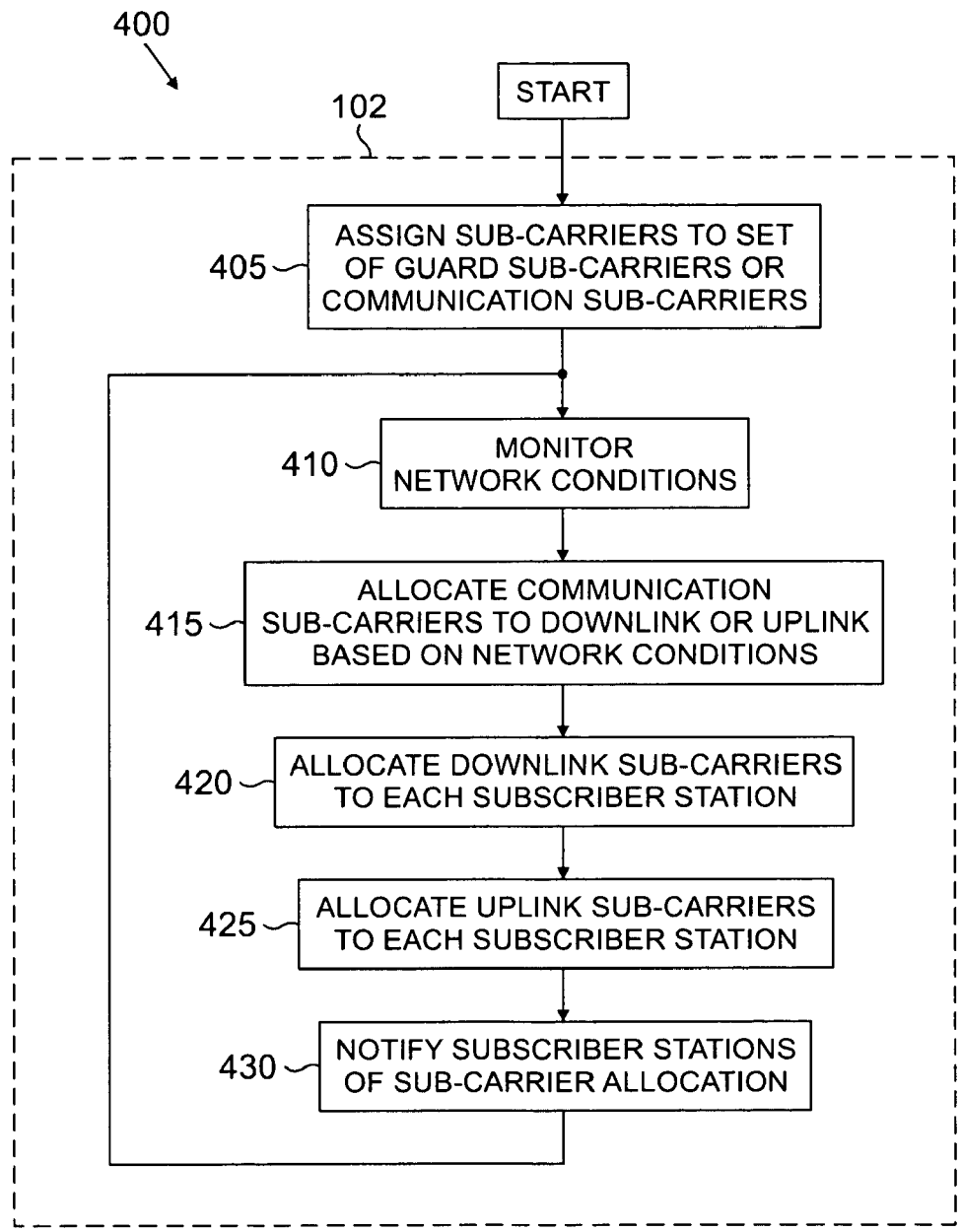
FIG. 4 is a flow diagram illustrating a method for dynamically allocating sub-carriers for communication according to an embodiment of the present disclosure.

FIG. 4 is a flow diagram illustrating a method 400 for dynamically allocating sub-carriers for communication according to an embodiment of the present disclosure. The method is described with respect to base station 102. However, it will be understood that the method may be performed by any suitable base station in network 100, such as base station 103.

Initially, the available sub-carriers for base station 102 may be assigned to the set of guard sub-carriers 302 and 304 or to the set of communication sub-carriers 306 and 308 by sub-carrier allocator 265 or by an operator of base station 102 (process step 405). Network monitor 260 monitors network conditions, such as traffic conditions, for network 100 (process step 410). Based on the network conditions, sub-carrier allocator 265 allocates each of the communication sub-carriers either to the set of downlink sub-carriers 306 or to the set of uplink sub-carriers 308 (process step 415).

Sub-carrier allocator 265 then allocates particular downlink sub-carriers 306 to each subscriber station 111-116 in the coverage area of base station 102 (process step 420) and allocates particular uplink sub-carriers 308 to each subscriber station 111-116 (process step 425). For one embodiment, sub-carrier allocator 265 may allocate downlink and uplink sub-carriers 306 and 308 based on traffic conditions for the individual subscriber stations 111-116. For another embodiment, sub-carrier allocator 265 may allocate downlink and uplink sub-carriers 306 and 308 equally between the subscriber stations 111-116.

After allocating sub-carriers for the subscriber stations 111-116, sub-carrier allocator 265 notifies each subscriber station 111-116 which of the sub-carriers have been allocated for communication between that subscriber station 111-116 and base station 102 (process step 430). Network monitor 260 continues to monitor network conditions for network 100 (process step 410) and sub-carrier allocator 265 may reallocate the communication sub-carriers 306 and 308 (process steps 415-430) at any time based on a change in the conditions monitored by network monitor 260.

In this way, both base station 102 and subscriber stations 111-116 are able to transmit simultaneously. Therefore, urgent messages may be sent without delay. In addition, subscriber stations 111-116 may transmit continuously. Thus, subscriber stations 111-116 need not shut off their power amplifiers, thereby avoiding an inefficient use of power capabilities.

While several embodiments have been provided in the present disclosure, it should be understood that the disclosed systems and methods may be embodied in many other specific forms without departing from the spirit or scope of the present disclosure. The exemplary embodiments disclosed are to be considered as illustrative and not restrictive, and the intention is not to be limited to the details given herein. It is intended that the disclosure encompass all alternate forms within the scope of the appended claims along with their full scope of equivalents.

What is claimed is:

1. A method of reallocating sub-carriers for communication with a base station in an orthogonal frequency division multiplexing network, wherein a set of downlink sub-carriers are allocated for the base station to transmit signals to a plurality of subscriber stations and a set of uplink sub-carriers are allocated for the base station to receive signals from the plurality of subscriber stations, the method comprising:
   assigning the sub-carriers for the base station to one of a set of guard sub-carriers and a set of communication sub-carriers, the communication sub-carriers comprising the set of downlink sub-carriers and the set of uplink sub-carriers;
   monitoring, by the base station, network conditions; and
   reallocating sub-carriers from one of the set of downlink sub-carriers and the set of uplink sub-carriers to the other of the set of downlink sub-carriers and the set of uplink sub-carriers based on the network conditions.

2. The method as set forth in claim 1, further comprising allocating the downlink sub-carriers to a plurality of subscriber stations.

3. The method as set forth in claim 2, further comprising notifying each of the subscriber stations which of the downlink sub-carriers are allocated to the subscriber station.

4. The method as set forth in claim 1, further comprising allocating the uplink sub-carriers to a plurality of subscriber stations.

5. The method as set forth in claim 4, further comprising notifying each of the subscriber stations which of the uplink sub-carriers are allocated to the subscriber station.

6. The method as set forth in claim 1, further comprising:
   continuing to monitor network conditions; and
   reallocating the sub-carriers for the base station to one of the set of downlink sub-carriers and the set of uplink sub-carriers based on a change in the network conditions.

7. The method as set forth in claim 1, the guard sub-carriers comprising at least one of edge guard sub-carriers and transition guard sub-carriers.

8. A method of reallocating sub-carriers for communication with a base station in an orthogonal frequency division multiplexing network, wherein a set of downlink sub-carriers are allocated for the base station to transmit signals to a plurality of subscriber stations and a set of uplink sub-carriers are allocated for the base station to receive signals from the plurality of subscriber stations, the method comprising:
   assigning sub-carriers for the base station to one of a set of guard sub-carriers and a set of communication sub-carriers, the set of guard sub-carriers comprising at least one of a set of edge guard sub-carriers and a set of transition guard sub-carriers;
   monitoring network conditions;
   reallocating the communication sub-carriers from one of the set of downlink sub-carriers and the set of uplink sub-carriers to the other of the set of downlink sub-carriers and the set of uplink sub-carriers based on the network conditions;
   allocating the downlink sub-carriers to a plurality of subscriber stations; and
   allocating the uplink sub-carriers to the subscriber stations.

9. The method as set forth in claim 8, further comprising:
   notifying each of the subscriber stations which of the downlink sub-carriers are allocated to the subscriber station; and
   notifying each of the subscriber stations which of the uplink sub-carriers are allocated to the subscriber station.

10. The method as set forth in claim 8, further comprising:
    continuing to monitor network conditions; and
    reallocating the sub-carriers for the base station to one of the set of downlink sub-carriers and the set of uplink sub-carriers based on a change in the network conditions.

11. A base station capable of reallocating sub-carriers for communication in an orthogonal frequency division multiplexing network, wherein a set of downlink sub-carriers are allocated for the base station to transmit signals to a plurality of subscriber stations and a set of uplink sub-carriers are allocated for the base station to receive signals from the plurality of subscriber stations, the base station comprising:
    a network monitor operable to monitor network conditions; and
    a sub-carrier allocator coupled to the network monitor, the network monitor further operable to:

assign the sub-carriers for the base station to one of a set of guard sub-carriers and a set of communication sub-carriers, the communication sub-carriers comprising the set of downlink sub-carriers and the set of uplink sub-carriers; and provide the network conditions to the sub-carrier allocator, the sub-carrier allocator operable to reallocate sub-carriers from one of the set of downlink sub-carriers and the set of uplink sub-carriers to the other of the set of downlink sub-carriers and the set of uplink sub-carriers based on the network conditions.

12. The base station as set forth in claim 11, the sub-carrier allocator further operable to allocate the downlink sub-carriers to a plurality of subscriber stations and to allocate the uplink sub-carriers to the subscriber stations.

13. The base station as set forth in claim 12, the sub-carrier allocator further operable to notify each of the subscriber stations which of the downlink sub-carriers are allocated to the subscriber station and to notify each of the subscriber stations which of the uplink sub-carriers are allocated to the subscriber station.

14. The base station as set forth in claim 11, the network monitor further operable to continue to monitor network conditions, and the sub-carrier allocator further operable to reallocate the sub-carriers for the base station to one of the set of downlink sub-carriers and the set of uplink sub-carriers based on a change in the network conditions.

15. The base station as set forth in claim 11, the guard sub-carriers comprising edge guard sub-carriers.

16. The base station as set forth in claim 11, the guard sub-carriers comprising transition guard sub-carriers.

* * * * *